(12) United States Patent
Damgaard

(10) Patent No.: US 6,731,693 B1
(45) Date of Patent: May 4, 2004

(54) SYSTEM OF AND METHOD FOR COMPENSATING A BASEBAND SIGNAL TO REDUCE THIRD ORDER MODULATION DISTORTION

(75) Inventor: Morten Damgaard, Laguna Hills, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/515,538

(22) Filed: Feb. 29, 2000

(51) Int. Cl.[7] ............................................. H04L 25/49
(52) U.S. Cl. ..................... 375/296; 455/114; 331/107; 331/127
(58) Field of Search ................. 375/296, 297, 375/302, 298, 373, 376; 455/114, 115, 125, 126, 116, 63, 67.1, 67.3; 330/149; 331/25, 14, 16, 17; 332/107, 123, 124, 127, 128, 159, 160, 162, 161, 176

(56) References Cited

U.S. PATENT DOCUMENTS

| | | | | |
|---|---|---|---|---|
| 4,414,686 A | * | 11/1983 | Lenz ............................ | 455/20 |
| 4,700,151 A | * | 10/1987 | Nagata ........................ | 332/123 |
| 5,148,448 A | * | 9/1992 | Karam et al. ................ | 375/298 |
| 5,293,406 A | * | 3/1994 | Suzuki ........................ | 375/295 |
| 5,705,949 A | * | 1/1998 | Alelyunas et al. ........... | 329/304 |
| 5,771,263 A | * | 6/1998 | Kanazawa et al. .......... | 375/261 |
| 5,850,305 A | * | 12/1998 | Pidgeon ...................... | 398/193 |
| 5,933,766 A | * | 8/1999 | Dent ........................... | 455/103 |
| 6,072,364 A | * | 6/2000 | Jeckeln et al. .............. | 330/149 |
| 6,075,411 A | * | 6/2000 | Briffa et al. ................ | 330/149 |
| 6,108,385 A | * | 8/2000 | Worley, III ................. | 375/296 |
| 6,150,890 A | * | 11/2000 | Damgaard et al. .......... | 331/14 |
| 6,236,837 B1 | * | 5/2001 | Midya ......................... | 455/63 |
| 6,240,278 B1 | * | 5/2001 | Midya et al. ................ | 455/126 |
| 6,255,912 B1 | * | 7/2001 | Laub et al. .................. | 331/25 |

OTHER PUBLICATIONS

Moffat, Mark, et al., *An ISM band Transceiver Chip for Digital Spread Spectrum Communication*, GEC Plessey Semiconductors, Inc., Scotts Valley, CA 95067, USA.

* cited by examiner

Primary Examiner—Khai Tran
Assistant Examiner—Khanh Cong Tran
(74) Attorney, Agent, or Firm—Mintz Levin Cohn Ferris Glovksy & Popeo, P.C.

(57) ABSTRACT

A system for and method of overcoming third order modulation distortion in which a baseband signal is predistorted using one or more parameters configured to reduce or eliminate the third order modulation distortion.

15 Claims, 13 Drawing Sheets

SYSTEM OF AND METHOD FOR COMPENSATING A BASEBAND SIGNAL TO REDUCE THIRD ORDER MODULATION DISTORTION

BACKGROUND OF THE INVENTION

1. Field of the Invention

This invention relates to third order modulation distortion, and, more specifically, to techniques for reducing or eliminating such distortion.

2. Background

In a quadrature modulator 1, illustrated in FIG. 1a, I and Q components of a baseband signal are respectively mixed by mixers 2 and 3 with I and Q components of a local oscillator signal, LOI and LOQ, and then combined by combiner 4 to form output signal 5. The I and Q components of the baseband signal are assumed to be in quadrature, i.e., out of phase by 90°. Similarly, the I and Q compopnents of the local oscillator signal are assumed to be at the same amplitude, and are also assumed to be in quadrature.

In applications in which the modulator 1 is part of a GSM wireless transmitter, a problem occurs when third order modulation distortion is introduced by modulator 1 in the output signal 5. The problem is that any third order product in the transmit signal must be less than −50 dBc in order to meet the stringent spectral requirements of the GSM specification. However, since the transmit signal is ultimately derived from the output of the quadrature modulator, any significant third order distortion in the output of the quadrature modulator will, in current designs, makes it difficult for the transmit signal to satisfy the GSM spectral requirement.

Moreover, simply boosting the linearity of the modulator by increasing the current thereto is not satisfactory since it results in excessive current consumption, and it also does not solve for third order distortion introduced by subsequent stages.

Consequently, there is a need for a system for and method of reducing third order modulation distortion which is more efficient or effective than conventional approaches.

SUMMARY OF THE INVENTION

In accordance with the purpose of the invention as broadly described herein, there is provided a system of reducing third order modulation distortion in which a baseband signal is predistorted by a predistortion circuit, and the predistorted baseband signal is then input to a quadrature modulator, which may be followed by a translational loop to upconvert the output signal from the quadrature modulator to RF frequencies. The predistortion introduced by the predistortion circuit compensates at least in part for third order distortion introduced by the quadrature modulator. The predistortion introduced by the predistortion circuit may be determined during a calibration procedure or may be determined in real-time.

In one implementation, the I and Q components of the baseband signal are predistorted in accordance with the following equations (in which the predistortion which is introduced is represented by the second and third terms in both equations):

$$I = A \cdot \cos(\phi) + C_{3+} \cdot \cos(3\phi + \theta_{3+}) + C_{3-} \cdot \cos(-3\phi + \theta_{3-})$$

$$Q = A \cdot \sin(\phi) + C_{3+} \cdot \sin(3\phi + \theta_{3+}) + C_{3-} \cdot \sin(-3\phi + \theta_{3-})$$

The ideal output of a modulator with I and Q input signals as given by the foregoing equations is:

$$s(t) = A \cdot \sin(\omega_c t + \phi) + C_{3+} \cdot \sin(\omega_c t + 3\phi + \theta_{3+}) + C_{3-} \cdot \sin(\omega_c t - 3\phi + \theta_{3-})$$

For a modulator with $3^{rd}$ order distortion, a good approximation to the output signal is:

$$s(t) \approx A \cdot \sin(\omega_c t + \phi) + C_{3+} \cdot \sin(\omega_c t + 3\phi + \theta_{3+}) + C_{3-} \cdot \sin(\omega_c t - 3\phi + \theta_{3-}) + A_{3+} \cdot \sin(\omega_c t + 3\phi + \Delta_{3+}) + A_{3-} \cdot \sin(\omega_c t - 3\phi + \Delta_{3-})$$

In this implementation, through a calibration procedure, the predistortion parameters $\theta_{3+}$, $C_{3+}$, $\theta_{3-}$, and $C_{3-}$ are set as follows:

$$\theta_{3+} \approx \Delta_{3+}$$

$$C_{3+} \approx -A_{3+}$$

$$\theta_{3-} \approx \Delta_{3-}$$

$$C_{3-} \approx -A_{3-}$$

Consequently, it can be seen that the $3^{rd}$ order products in the foregoing equation will be reduced or canceled.

A related method of operation is also provided.

DETAILED DESCRIPTION OF THE PREFERRED EMBODIMENTS

I. Example Environment

Figure 1A:
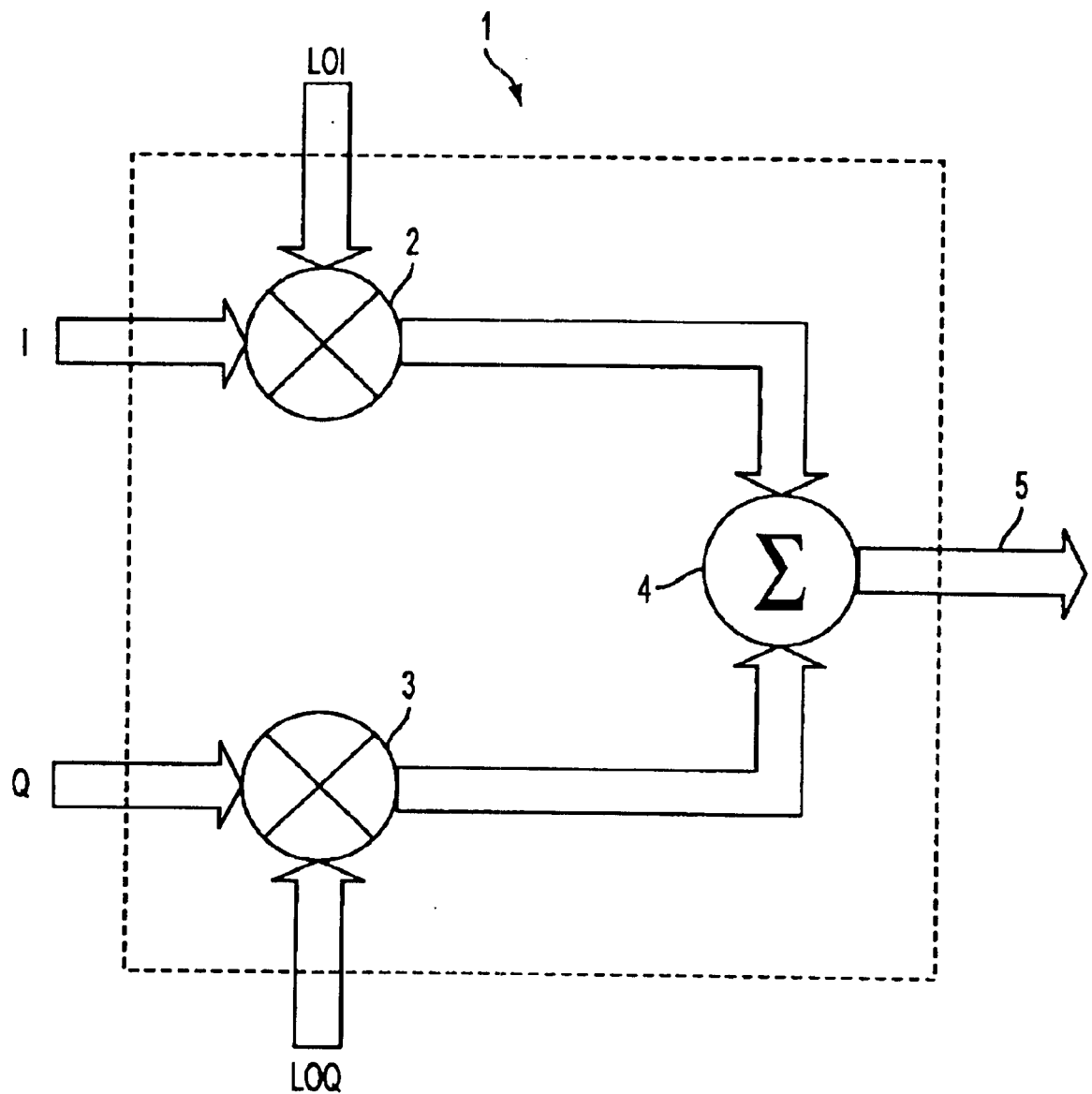
FIG. 1a illustrates a quadrature modulator.

Wireless communication systems are an integral component of the ongoing technology revolution. Mobile radio communication systems, such as cellular telephone systems, are evolving at an exponential rate. In a cellular system, a coverage area is divided into a plurality of "cells". A cell is the coverage area of a base station or transmitter. Low power transmitters are utilized, so that frequencies used in one cell can also be used in cells that are sufficiently distant to avoid interference. Hence, a cellular telephone user, whether mired in traffic gridlock or attending a meeting, can transmit and receive phone calls so long as the user is within a "cell" served by a base station.

Mobile cellular systems were originally developed as analog systems. After their introduction for commercial use in the early 1980s, mobile cellular systems began to experience rapid and uncoordinated growth. In Europe, for example, individual countries developed their own systems. Generally, the systems of individual countries were incompatible, which constricted mobile communications within national boundaries and restricted the market for mobile equipment developed for a particular country's system.

In 1982, in order to address this growing problem, the Conference of European Posts and Telecommunications (CEPT) formed the Groupe Spéciale Mobile (GSM) to study and develop a set of common standards for a future pan-European cellular network. It was recommended that two blocks of frequencies in the 900 MHz range be set aside for the system.

The initial goals for the new system included international roaming ability, good subjective voice quality, compatibility with other systems such as the Integrated Services Digital Network (ISDN), spectral efficiency, low handset and base station costs, and the ability to support new services and a high volume of users. One of the initial, major decisions in the development of the GSM standard was adoption of a digital, rather than an analog, system. As mentioned above, analog systems were experiencing rapid growth and the increasing demand was straining the capacity of the available frequency bands. Digital systems offer improved spectral efficiency and are more cost efficient. The quality of digital transmission is also superior to that of analog transmission. Background sounds such as hissing and static and degrading effects such as fadeout and cross talk are largely eliminated in digital systems. Security features such as encryption are more easily implemented in a digital system. Compatibility with the ISDN is more easily achieved with a digital system. Finally, a digital approach permits the use of Very Large Scale Integration (VLSI), thereby facilitating the development of cheaper and smaller mobile handsets.

In 1989, the European Telecommunications Standards Institute (ETSI) took over responsibility for the GSM standards. In 1990, phase I of the standard was published and the first commercial services employing the GSM standard were launched in 1991. It was also renamed in 1991 as the Global System for Mobile Communications (still GSM). After its early introduction in Europe, the standard was elevated to a global stage in 1992 when introduced in Australia. Since then, GSM has become the most widely adopted and fastest growing digital cellular standard, and is positioned to become the world's dominant cellular standard. With (currently) 324 GSM networks in operation in 129 countries, GSM provides almost complete global coverage. As of January 1999, according to the GSM Memorandum of Understanding Association, GSM accounted for more than 120 million subscribers. Market research firms estimate that by 2001, there will be more than 250 million GSM subscribers worldwide. At that time, GSM will account for almost 60% of the global cellular subscriber base, with yearly shipments exceeding 100 million phones.

Figure 4A:
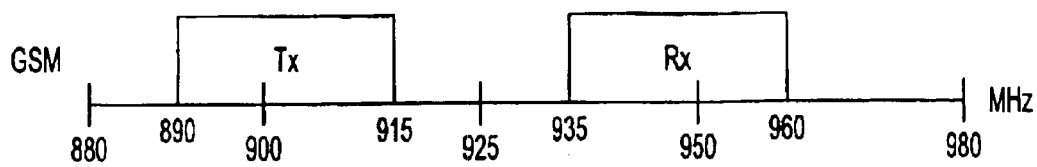
FIG. 4a illustrates the GSM transmit and receive bands.
Figure 4B:
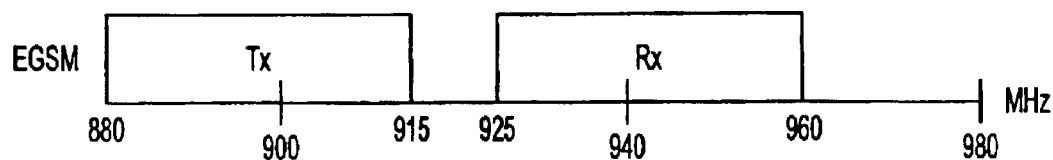
FIG. 4b illustrates the EGSM transmit and receive bands.

Two frequency bands of 25 MHz were allocated for GSM use. As illustrated in FIG. 4a, the 890–915 MHz band is reserved for transmission or "uplink" (mobile station to base station), and the 935–960 MHz band is reserved for reception or "downlink" (base station to mobile station). An extra ten MHz of bandwidth was later added to each frequency band. The standard incorporating this extra bandwidth (two 35 MHz bands) is known as Extended GSM (EGSM). In EGSM, the transmission band covers 880–915 MHz and the receiving band covers 925–960 MHz (FIG. 4b). The terms GSM and EGSM are used interchangeably, with GSM sometimes used in reference to the extended bandwidth portions (880–890 MHz and 925–935 MHz). Sometimes, the originally specified 890–915 MHz and 935–960 MHz bands are designated Primary GSM (PGSM). In the following description, GSM will be used in reference to the extended bandwidth (35 MHz) standard.

Figure 4C:
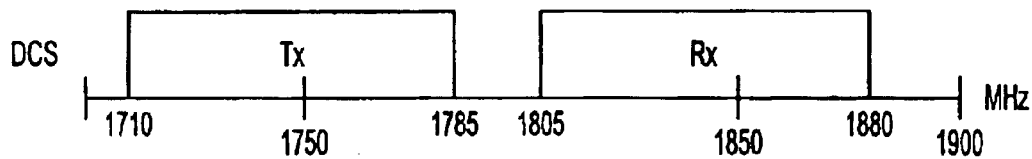
FIG. 4c illustrates the DCS transmit and receive bands.
Figure 4D:
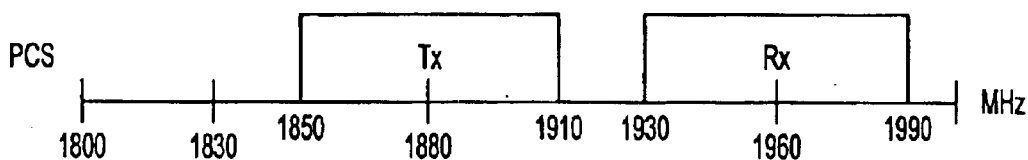
FIG. 4d illustrates the PCS transmit and receive bands.

Due to the expected widespread use of GSM, capacity problems in the 900 MHz frequency bands were anticipated and addressed. ETSI had already defined an 1800 MHz variant (DCS or GSM 1800) in the first release of the GSM standard in 1989. In DCS, the transmission band covers 1710–1785 MHz and the receiving band covers 1805–1880 MHz (FIG. 4c). In the United States, the Federal Communications Commission (FCC) auctioned large blocks of spectrum in the 1900 MHz band, aiming to introduce digital wireless networks to the country in the form of a mass market Personal Communication Service (PCS). The GSM service in the US is known as PCS or GSM 1900. In PCS, the transmission band covers 1850–1910 MHz and the receiving band covers 1930–1990 MHz (FIG. 4d).

Regardless of which GSM standard is used, once a mobile station is assigned a channel, a fixed frequency relation is maintained between the transmit and receive frequency bands. In GSM (900 MHz), this fixed frequency relation is 45 MHz. If, for example, a mobile station is assigned a transmit channel at 895.2 MHz, its receive channel will always be at 940.2 MHz. This also holds true for DCS and PCS; the frequency relation is just different. In DCS, the receive channel is always 95 MHz higher than the transmit channel and, in PCS, the receive channel is 80 MHz higher than the transmit channel. This frequency differential will be referred to in the ensuing discussion as the frequency offset.

Figure 5:
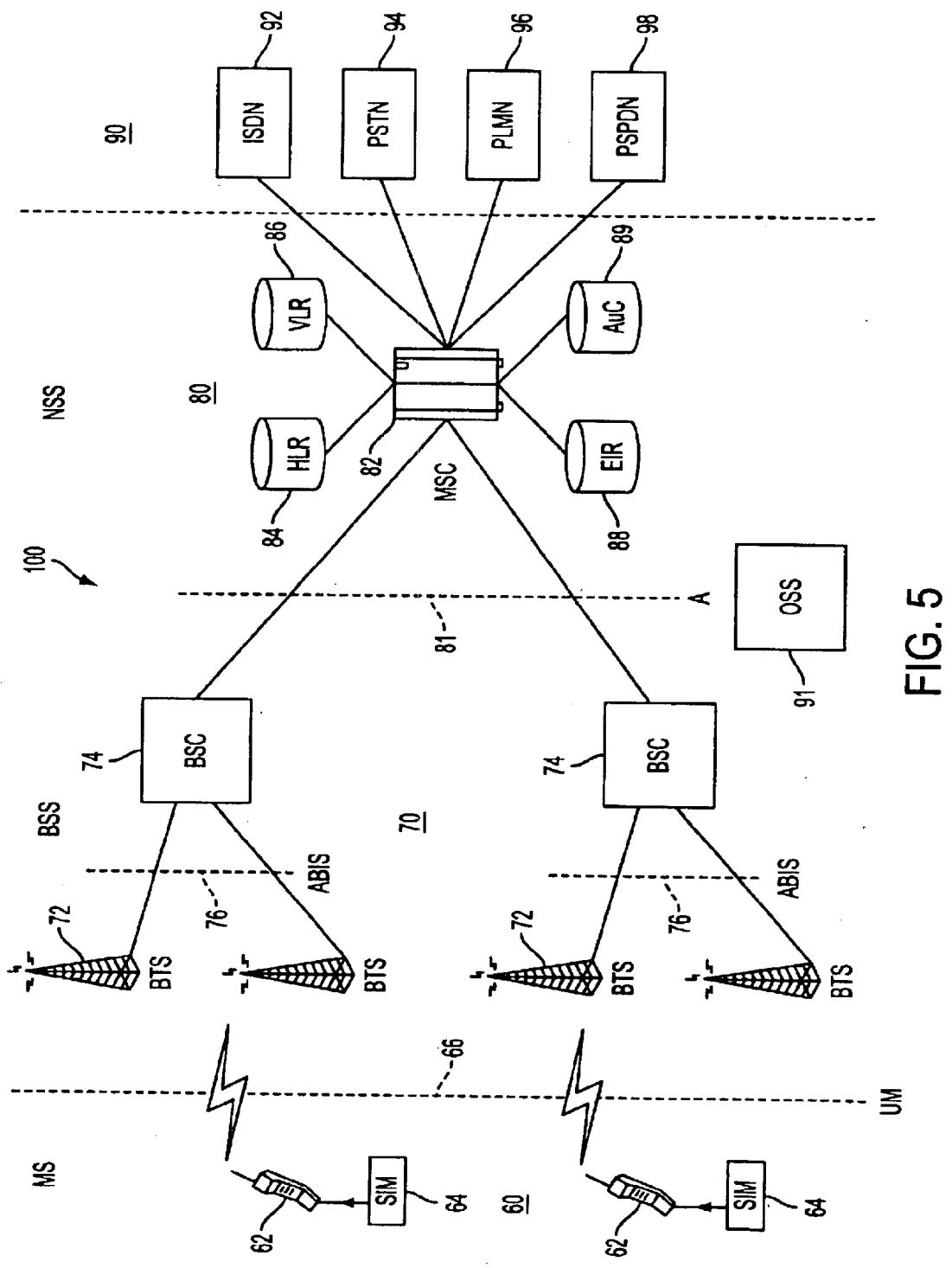
FIG. 5 illustrates a wireless communication system.

The architecture of one implementation of a GSM network 100 is depicted in block form in FIG. 5. GSM network 100 is divided into four interconnected components or subsystems: a Mobile Station (MS) 60, a Base Station Subsystem (BSS) 70, a Network Switching Subsystem (NSS) 80 and an Operation Support Subsystem (OSS) 91. Generally, MS 60 is the mobile equipment or phone carried by the user; BSS 70 interfaces with multiple MSs 60 and manages the radio transmission paths between the MSs and NSS 80; NSS 80 manages system switching functions and facilitates communications with other networks such as the PSTN and the ISDN; and OSS 91 facilitates operation and maintenance of the GSM network.

Mobile Station 60 comprises Mobile Equipment (ME) 62 and Subscriber Identity Module (SIM) 64. ME 62 is typically a digital mobile phone or handset. SIM 64 is a memory device that stores subscriber and handset identification information. It is implemented as a smart card or as a plug-in module and activates service from any GSM phone. Among the information stored on SIM 64 are a unique International Mobile Subscriber Identity (IMSI) that identifies the subscriber to system 100, and an International Mobile Equipment Identity (IMEI) that uniquely identifies the mobile equipment. A user can access the GSM network via any GSM handset or terminal through use of the SIM. Other information, such as a personal identification number (PIN) and billing information, may be stored on SIM 64.

MS 60 communicates with BSS 70 across a standardized "Um" or radio air interface 66. BSS 70 comprises multiple base transceiver stations (BTS) 72 and base station controllers (BSC) 74. A BTS is usually in the center of a cell and consists of one or more radio transceivers with an antenna. It establishes radio links and handles radio communications over the Um interface with mobile stations within the cell. The transmitting power of the BTS defines the size of the cell. Each BSC 74 manages multiple, as many as hundreds of, BTSs 72. BTS-BSC communication is over a standardized "Abis" interface 76, which is specified by GSM to be standardized for all manufacturers. The BSC allocates and manages radio channels and controls handovers of calls between its BTSs.

The BSCs of BSS 70 communicate with network subsystem 80 over a GSM standardized "A" interface 81. The A interface uses an SS7 protocol and allows use of base stations and switching equipment made by different manufacturers. Mobile Switching Center (MSC) 82 is the primary component of NSS 80. MSC 82 manages communications between mobile subscribers and between mobile subscribers and public networks 90. Examples of public networks 90 that MSC 82 may interface with include Integrated Services Digital Network (ISDN) 92, Public Switched Telephone Network (PSTN) 94, Public Land Mobile Network (PLMN) 96 and Packet Switched Public Data Network (PSPDN) 98.

MSC 82 interfaces with four databases to manage communication and switching functions. Home Location Register (HLR) 84 contains details on each subscriber residing within the area served by the MSC, including subscriber identities, services to which they have access, and their current location within the network. Visitor Location Register (VLR) 86 temporarily stores data about roaming subscribers within a coverage area of a particular MSC. Equipment Identity Register (EIR) 88 contains a list of mobile equipment, each of which is identified by an IMEI, which is valid and authorized to use the network. Equipment that has been reported as lost or stolen is stored on a separate list of invalid equipment that allows identification of subscribers attempting to use such equipment. The Authorization Center (AuC) 89 stores authentication and encyrption data and parameters that verify a subscriber's identity.

OSS 91 contains one or several Operation Maintenance Centers (OMC) that monitor and maintain the performance of all components of the GSM network. OSS 91 maintains all hardware and network operations, manages charging and billing operations and manages all mobile equipment within the system.

Figure 6:
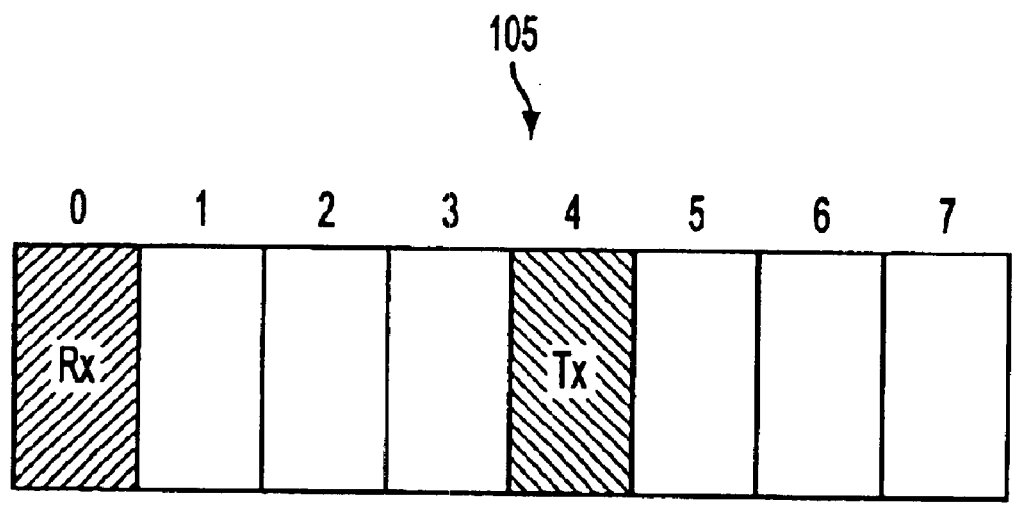
FIG. 6 illustrates one implementation of the TDMA frame structure.

The GSM transmitting and receiving bands are divided into 200 kHz carrier frequency bands. Using Time Division Multiple Access techniques (TDMA), each of the carrier frequencies is subdivided in time into eight time slots. Each time slot has a duration of approximately 0.577 ms, and eight time slots form a TDMA "frame", having a duration of 4.615 ms. One implementation of a conventional TDMA frame 105 having eight time slots 0–7 is illustrated in FIG. 6.

In this conventional TDMA framework, each mobile station is assigned one time slot for receiving data and one time slot for transmitting data. In TDMA frame 105, for example, time slot zero has been assigned to receive data and time slot four has been assigned to transmit data. The receive slot is also referred to as the downlink slot and the transmit slot is referred to as the uplink slot. After the eight slots, the remaining slots are used for offset, control, monitoring and other operations. This framework permits concurrent reception by as many as eight mobile stations on one frequency and concurrent transmission by as many as eight mobile stations on one frequency.

As described above, there are currently three GSM frequency bands defined. With the proliferation of wireless handset usage not showing signs of slowing down, it is likely that additional bands will be defined in the future.

A simplified block diagram of one embodiment of the RF front-end of a GSM transmitter configured for use in any of the mobile or base station units described earlier in this section is illustrated in FIG. 1b in which, compared to FIG. 1a, like elements are referenced with like identifying numerals. As illustrated, a complex baseband signal having I and Q components is input to quadrature modulator 1. In one implementation, the I and Q components comprise a digitized baseband signal output by a DSP (digital signal processor). The quadrature modulator, responsive to an intermediate frequency local oscillator signal, identified by IFLO, modulates the complex baseband signal onto the intermediate frequency signal to produce output signal 5. The output signal 5 is input to translational loop 10, which upconverts the modulator output to RF frequencies for transmission. A power amplifier (not shown) amplifies the RF frequency signal, and the amplified signal is then transmitted over a wireless interface by an antenna (not shown).

Translation loop 10 comprises phase detector 11, voltage controlled oscillator (VCO) 12, downconversion mixer 13, and filter 15. In addition, one or more additional filters (not shown) may be included before or in the loop to perform various functions.

The output of downconversion mixer 13 is filtered by filter 15 to remove unwanted components. The filtered signal is then provided as an input to phase detector 11. The other input to phase detector 11 is the output 5 of quadrature modulator 1.

Phase detector 11 compares the phase of the signals provided at its two inputs, and outputs a signal having a magnitude proportional to the phase difference between the two input signals. The output of phase detector 11, which forms the output 16 of the translational loop, is then provided as an input to VCO 12.

The output of VCO 12 is input to the RF input of mixer 13. Responsive to a second local oscillator signal, identified as LO2, mixer 13 downconverts the frequency of the output signal 16 by the frequency of LO2.

Translation loop 10 functions to upconvert the modulator output 5 by the frequency of the second oscillator signal LO2 so that it is within the selected transmit channel frequency band. The loop functions as follows. The output of VCO 12 is provided to mixer 13. Mixer 13 downconverts this output by the frequency of the second local oscillator signal LO2. The downconverted signal, after filtering by filter 15, is provided as an input to phase detector 11.

Phase detector 11 compares the phase of the downconverted signal with that of the modulator output 5, and adjusts its output until the phase of these two signals is about the same. Any discrepancy between the phase of these two signals is resolved by altering the frequency of the output signal 16. The result of this is to upconvert the output signal 16 by the frequency of the second local oscillator signal LO2.

Any discrepancy between the downconverted frequency and the frequency of the modulator output 5 is resolved by altering the frequency of the output signal 16. The result of this is to upconvert the output signal 16 by the frequency of the second local oscillator signal LO2.

II. Preferred Embodiments

Figure 1B:
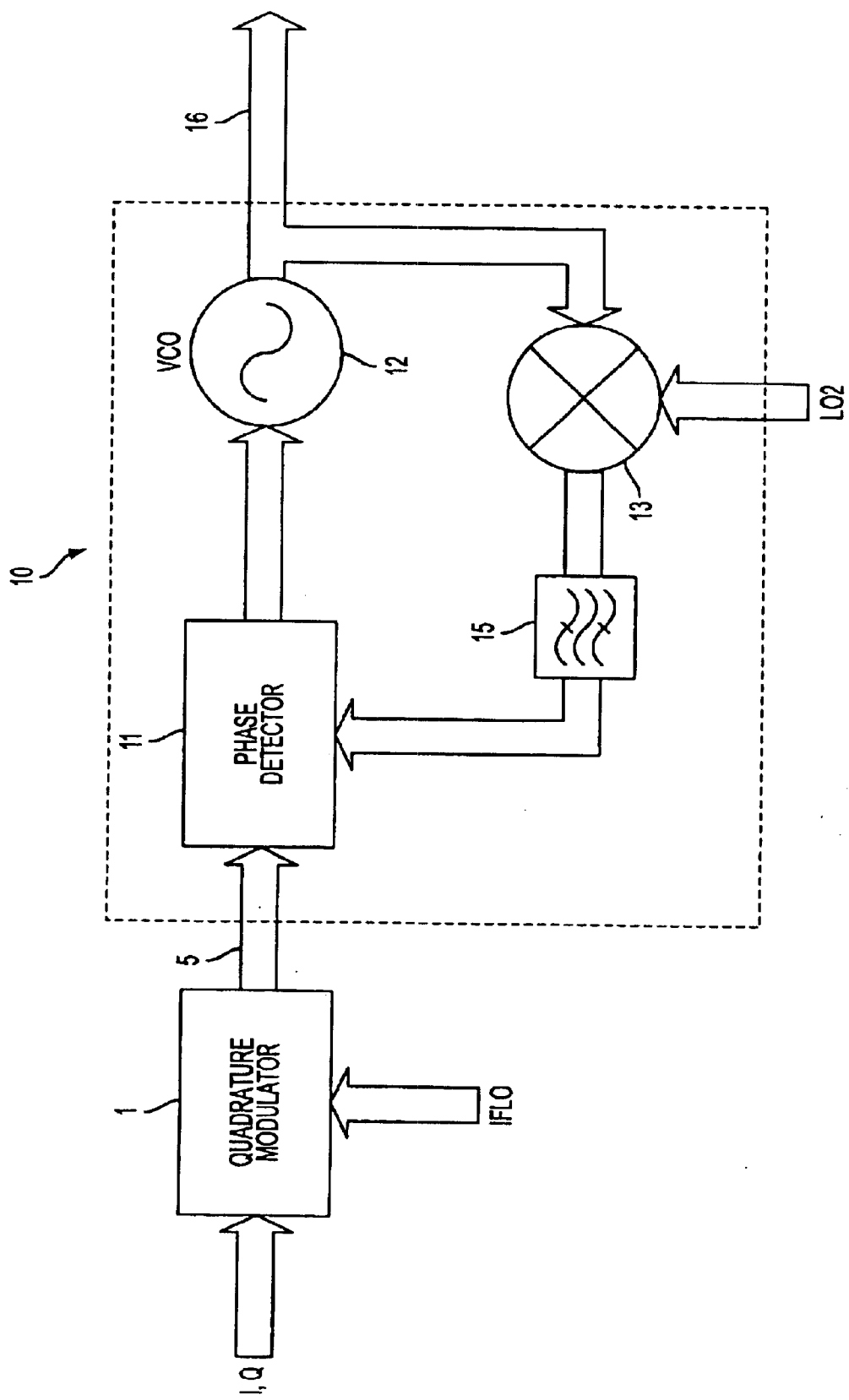
FIG. 1b illustrates a quadrature modulator followed by a translational loop.

In the RF front end of FIG. 1b, any non-linearity of the modulator 1 will introduce third order distortion products in the output 5 of the modulator. Assuming the wanted sideband at the output of the modulator 1 is at the frequency $\omega_w = \omega_c + \omega_m$, where $\omega_c$ is the carrier frequency (the frequency of the local oscillator) and $\omega_m$ is the modulating frequency (the frequency of the baseband signal), the third order distortion products will be at the frequencies $\omega_c + 3\omega_m = \omega_w + 2\omega_m$ and $\omega_c - 3\omega_m = \omega_w - 4\omega_m$. In the time domain, these distortion products show up as unintentional modulation of the carrier frequency. This unintentional modulation has an AM component and an FM component. Since the translational loop 10 is only sensitive to the phase of the output 5 of modulator 1, the loop strips off the AM component of the unintentional modulation, leaving only the FM components thereof. The result is that the frequency spectrum at the output of the translation loop may and is likely to violate the limits imposed by the GSM specification.

The subject invention is provided to overcome or reduce this problem. A first embodiment 20 of a system in accordance with the subject invention is presented in FIG. 2a in which, compared to FIG. 1b, like elements are referenced with like identifying numerals. As illustrated, this embodiment includes predistortion circuit 21, which receives the baseband signal BB, and predistorts that signal to overcome or reduce the third order distortion products introduced by the modulator 1. In one implementation, the predistortion circuit 21 is configured to overcome or reduce the third order distortion products as introduced by the modulator 1 but later affected by the translation loop 10. In one implementation example, the predistortion circuit 21 includes a memory 22 for the storage of one or more parameters which govern the type and manner of predistortion introduced by the predistortion circuit 21.

In one configuration, the predistortion circuit 21 employs a lookup table to predistort the baseband signal as an integral part of determining the I and Q components of the baseband signal. For each phase $\phi$ in a particular range, the lookup table provides the values $\sin\phi$ and $\cos\phi$. The baseband signal BB input to the predistortion circuit 21 has an amplitude A(t) and a phase $\phi(t)$. The predistortion circuit 21 first uses the lookup table to determine $\cos(\phi(t))$ and $\sin(\phi(t))$. It then determines the I and Q components of the baseband signal using the following equations:

$$I(t) = A(t) \cdot \cos(\phi(t))$$

and $Q(t) = A(t) \cdot \sin(\phi(t))$ where A(t) is the amplitude of the baseband signal,
and $\phi(t)$ is the phase of the baseband signal.

Following this, the predistortion circuit 21 retrieves predistortion parameters $\theta_{3+}$, $C_{3+}$, $\theta_{3-}$, and $C_{3-}$ (the derivation of which is discussed farther on in this specification), and uses the same lookup table to determine $\cos(3\phi+\theta_{3+})$, $\cos(-3\phi+\theta_{3-})$, $\sin(3\phi+\theta_{3+})$, and $\sin(-3\phi+\theta_{3-})$. Thereafter, it computes the components I' and Q' of the predistorted baseband signal using the following equations:

$$I = A \cdot \cos(\phi) + C_{3+} \cdot \cos(3\phi+\theta_{3+}) + C_{3-} \cdot \cos(-3\phi+\theta_{3-})$$

and $Q = A \cdot \sin(\phi) + C_{3+} \cdot \sin(3\phi+\theta_{3+}) + C_{3-} \cdot \sin(-3\phi+\theta_{3-})$ In an alternate configuration, the I and Q components of the baseband signal are input to the predistortion circuit 21, which then determines the components I' and Q' of the predistorted baseband signal as described above.

Figure 2A:
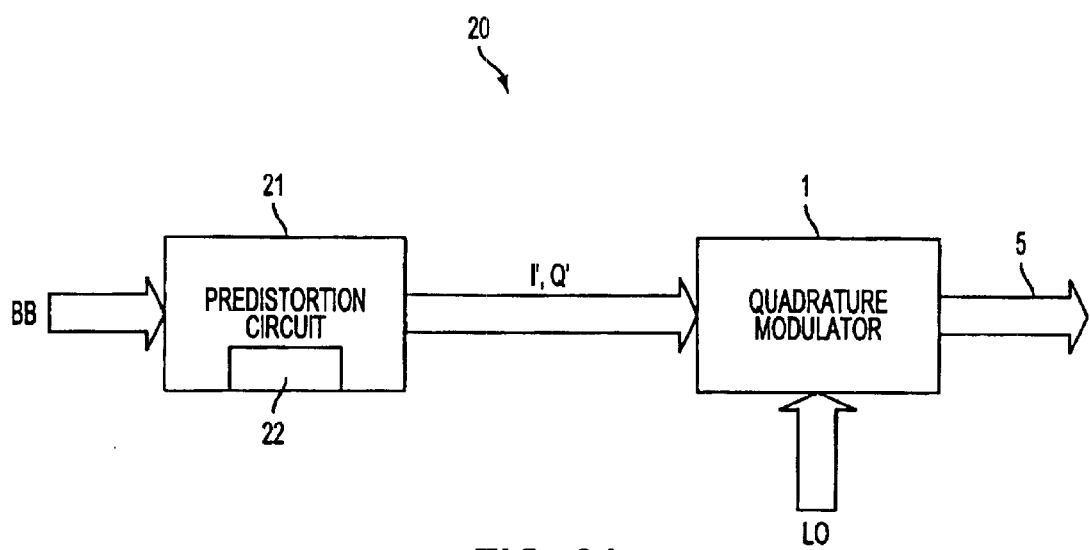
FIG. 2a illustrates a first embodiment of a system in accordance with the subject invention.

In the embodiment of FIG. 2a, it should be appreciated that modulator 1 may be followed by a translational loop, or, in the case of a direct conversion transmitter, in which the baseband signal is upconverted to the desired transmit frequency by modulator 1, the translational loop may be excluded. In this latter case, because of compression introduced by downstream components such as a power amplifier, the frequency spectrum at the output of the downstream component may still violate the applicable GSM specification, so that predistortion of the baseband signal is still required.

Figure 2B:
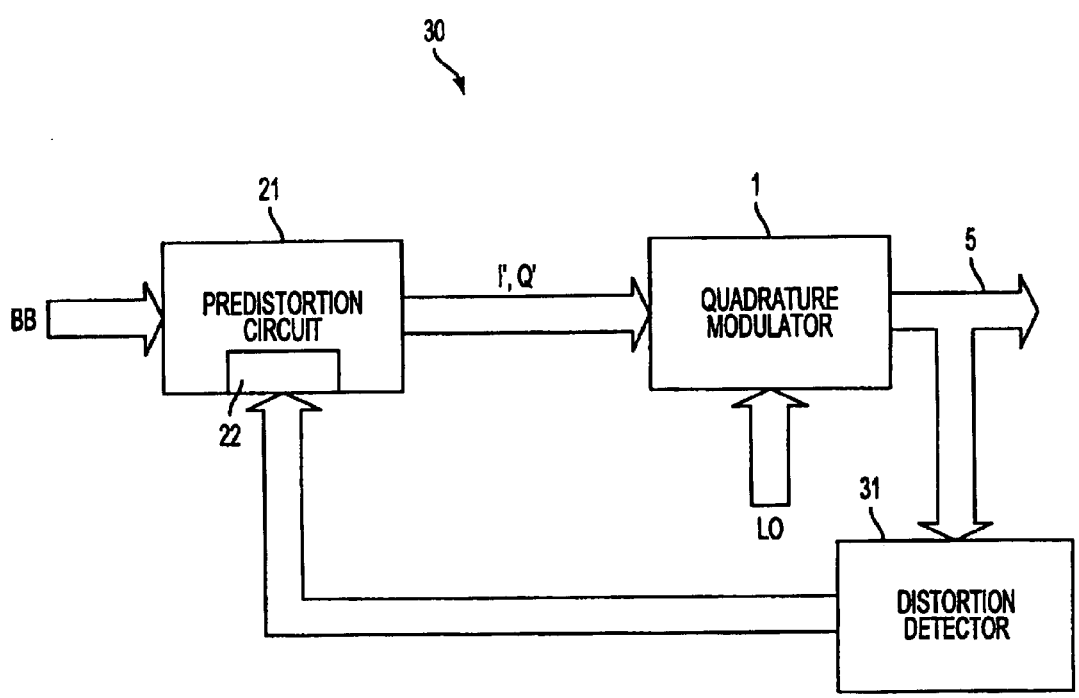
FIG. 2b illustrates a second embodiment of a system in accordance with the subject invention.

A second embodiment 30 of a system in accordance with the subject invention is illustrated in FIG. 2b in which, compared to FIG. 1a, like elements are referenced with like identifying numerals. As illustrated, this embodiment includes distortion detector 31 which has an input coupled to the output 5 of the modulator 1, and also has an output coupled to predistortion circuit 21. In this embodiment, distortion detector 31 measures the level of third order modulation distortion in the output 5 of modulator 1, and, responsive thereto, establishes the predistortion introduced by the predistortion circuit 21. In one implementation, this occurs during a calibration mode of operation in which a continuous wave (CW) baseband signal is input to the modulator 1, the distortion detector 31 measures the resulting level of third order modulation distortion in the output of the modulator 1, and, responsive thereto, establishes the predistortion to be introduced by the predistortion circuit 21 in a subsequent transmit mode of operation. In one implementation example, the predistortion may be represented in the form of one or more parameters which are stored in a memory 22 contained within the predistortion circuit 21. These parameters are retrieved and used during the transmit mode of operation to predistort a real-world baseband signal input to the predistortion circuit 21. In another implementation, distortion detector 31 operates, periodically, intermittently, or continuously, during the transmit mode of operation to measure the third order modulation distortion in the output of the quadrature modulator 1, and, responsive thereto, establish the predistortion which is applied by the predistortion circuit 21 in real-time.

Figure 2C:
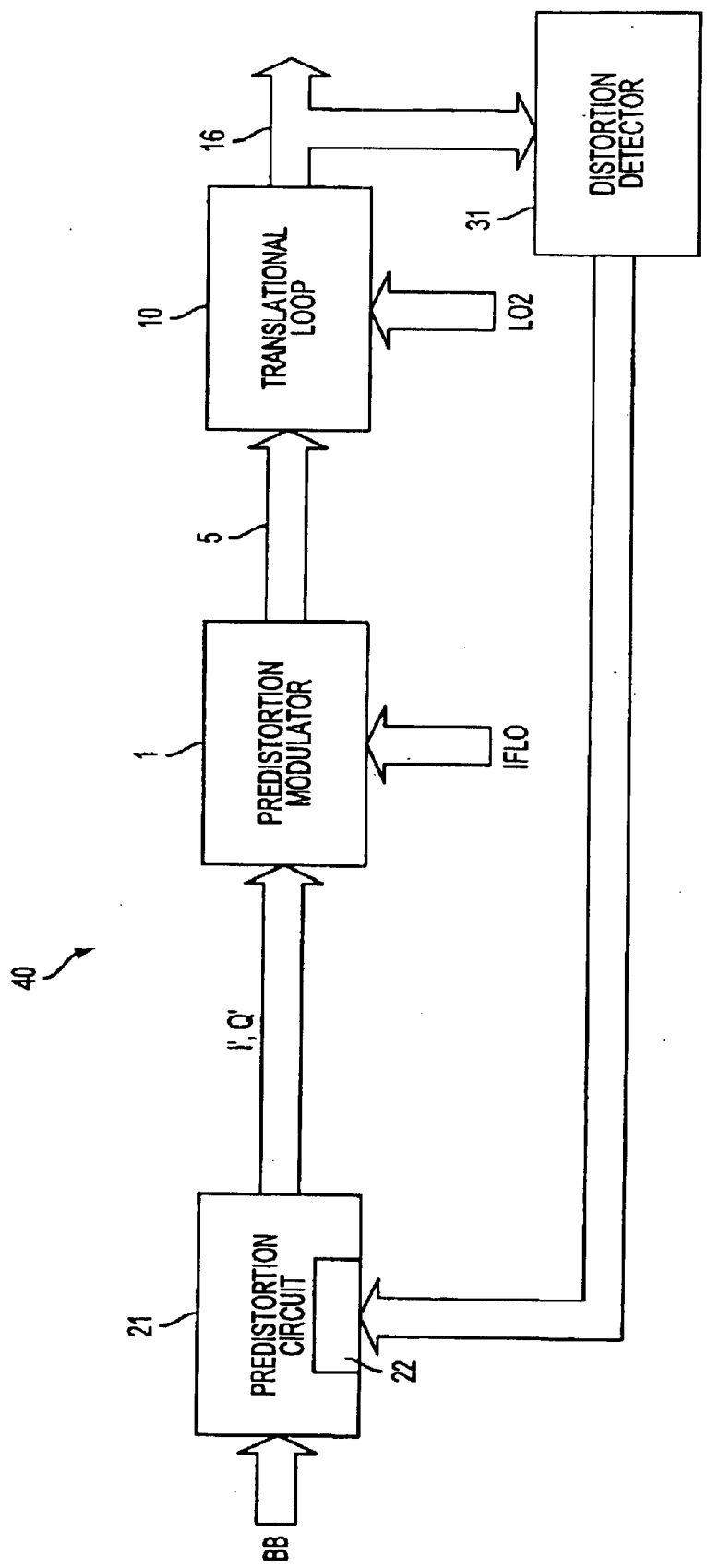
FIG. 2c illustrates a third embodiment of a system in accordance with the subject invention.

A third embodiment 40 of a system in accordance with the subject invention is illustrated in FIG. 2c in which, compared to FIGS. 2a and 2b, like elements are referenced with like identifying numerals. As illustrated, this embodiment includes distortion detector 41 which has an input coupled to the output 16 of translational loop 16, and an output coupled to the predistortion circuit 21. In this embodiment, distortion circuit 31 measures third order modulation distortion (as affected by the translational loop 10) in the output 16 of the translational loop 10, and, responsive thereto, establishes the predistortion applied by predistortion circuit 21. Again, an implementation is possible in which the predistortion is established during a calibration mode of operation using a CW baseband signal, parameters representative thereof are stored in a memory 22 of the predistortion circuit 21, and the parameters retrieved and applied to predistort the baseband signal during a subsequent transmit mode of operation. Alternatively, another implementation is possible in which the predistortion is established, periodically, intermittently, or continuously, in real-time during the transmit mode of operation.

Figure 3A:
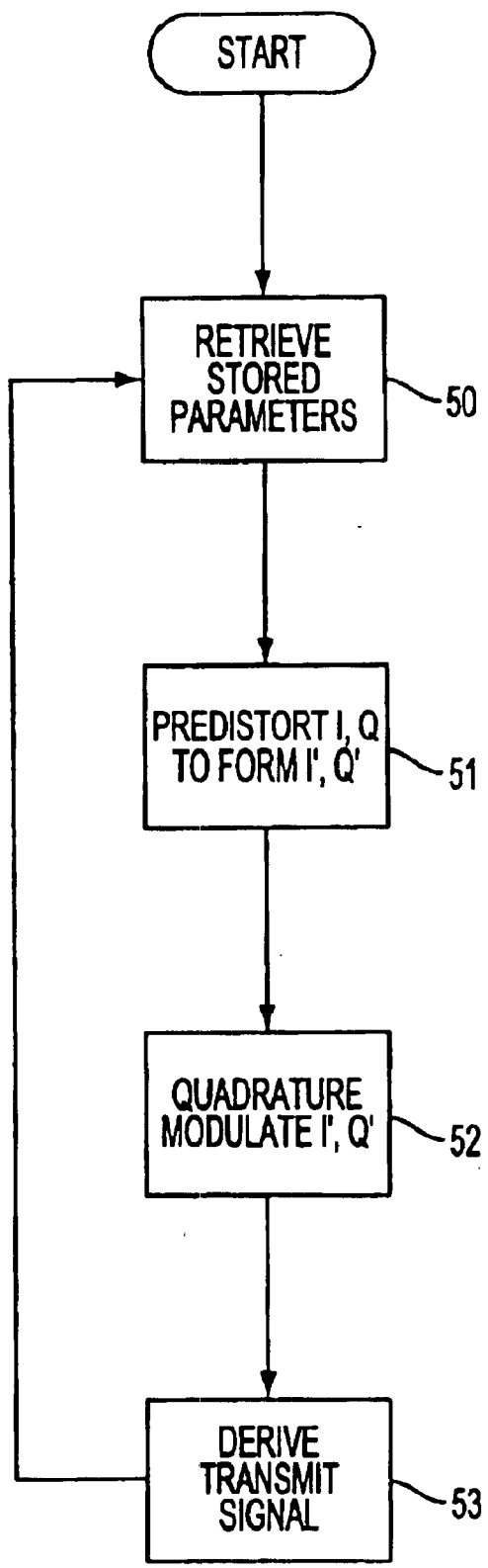
FIG. 3a illustrates a first embodiment of a method in accordance with the subject invention.

FIG. 3a illustrates an embodiment of a method for predistorting a baseband signal to reduce or eliminate third order modulation distortion in accordance with the subject invention. As illustrated, the method includes, in step 50, retrieving one or more parameters representative of the predistortion to be applied to the baseband signal. Then, in step 51, the method includes predistorting the baseband signal responsive to the one or more parameters retrieved in step 51. Then, in step 52, the method includes quadrature modulating the predistorted baseband signal. In step 53, the method includes deriving the transmit signal from the modulated signal resulting from step 52. In one implementation, this step comprises upconverting the modulated signal to RF frequencies. A jump to step 50 may then be performed, whereupon the foregoing process may then iterate one or more times as the baseband signal changes over time.

Figure 3B:
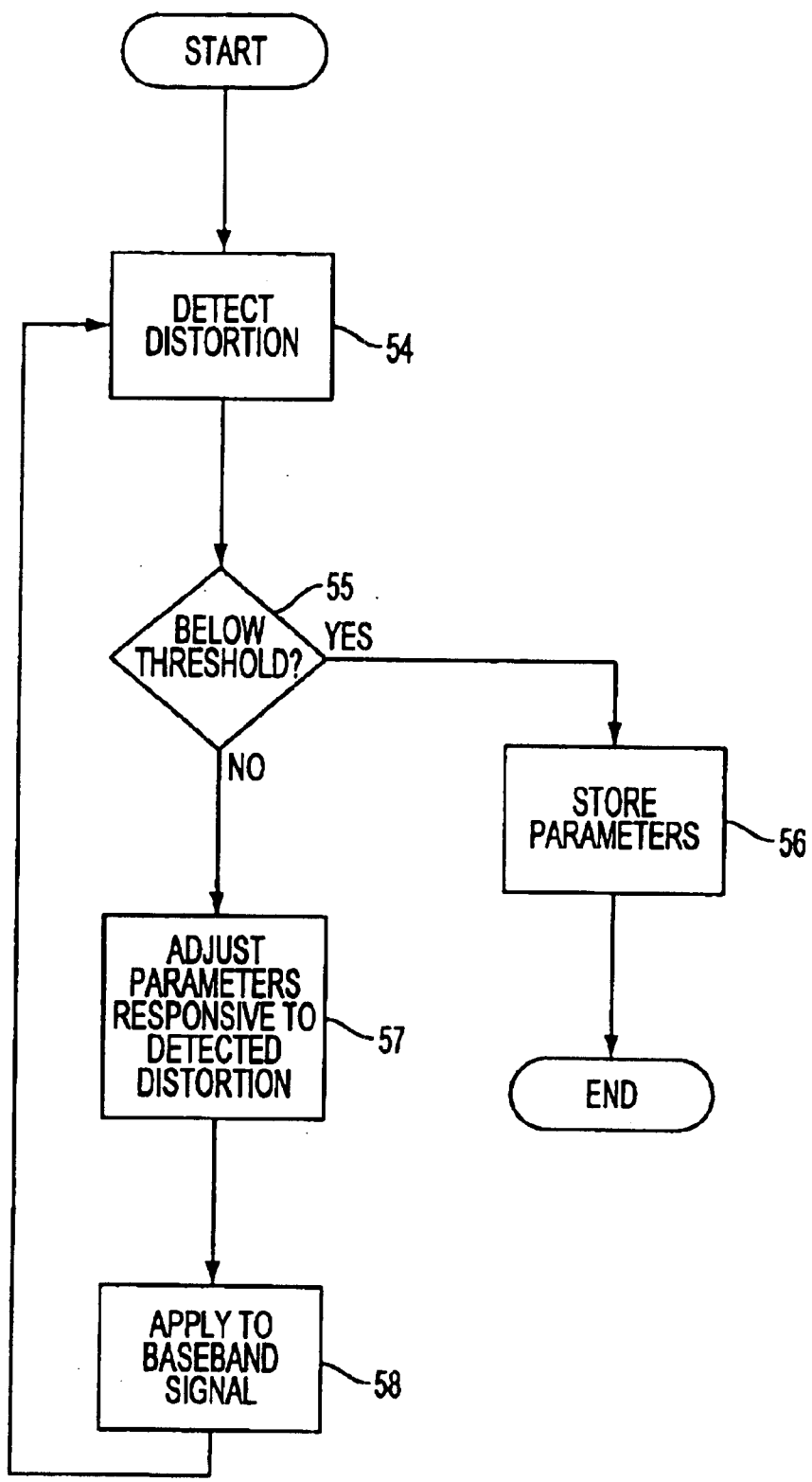
FIG. 3b illustrates a second embodiment of a method in accordance with the subject invention.

An embodiment of a method for determining one or more predistortion parameters in accordance with the subject invention is illustrated in FIG. 3b. In step 54, the method includes detecting third order modulation distortion in either the output of the modulator, or a signal derived therefrom, such as the output of a translational loop downstream from the modulator. In step 55, a determination is made whether the detected distortion is below a threshold or not. In so, a jump is made to step 56, in which one or more predistortion parameters previously applied to the baseband signal are stored, and the process ends. If not, a jump is made to step 57, and the one or more predistortion parameters are adjusted responsive to the detected distortion. Step 58 is then performed, whereby the baseband signal is predistorted with the adjusted predistortion parameters. The method then jumps to step 54, whereupon the process repeats itself. In one implementation, this process occurs during a calibration mode of operation. In another implementation, the process occurs, periodically, intermittently, or continuously, in real-time during a transmit mode of operation.

The foregoing systems may be implemented in the form of hardware, software, or a combination of hardware and software. Examples include a predistortion circuit which is implemented as custom hardware, or as a Digital Signal Processor (DSP) programmed appropriately. In addition, the foregoing methods may be tangibly embodied as computer software stored on a computer readable medium.

III. Implementation Example

The generation of the baseband I and Q signals is normally characterized by the following equations:

$$I(t) = A(t) \cdot \cos(\phi(t)) \tag{1a}$$

and $Q(t) = A(t) \cdot \sin(\phi(t))$ (1b)

where A(t) is the amplitude of the modulated signal,
and φ(t) is the phase of the modulated signal.

In the following, the shorthand notation I, Q, and φ is used for I(t), Q(t) and φ(t). Furthermore it is assumed that the amplitude is constant A(t)=A as in the case of the GMSK modulation used in GSM.

The modulation frequency is given by:

$$\omega_m = \frac{d\varphi}{dt} \tag{2}$$

The ideal output of the modulator:

$$s(t) = I \cdot \sin(\omega_c t) + Q \cdot \cos(\omega_c t) = A \cdot \sin(\omega_c t + \phi) \tag{3}$$

where $A = \sqrt{I^2 + Q^2}$ (4)

and $$\varphi = \tan^{-1}\left(\frac{Q}{I}\right) \tag{5}$$

For 3$^{rd}$ order distortion in the modulator:

$$s(t) = A \cdot \sin(\omega_c t + \phi) + A_{3+} \cdot \sin(\omega_c t + 3\phi + \Delta_{3+}) + A_{3-} \cdot \sin(\omega_c t - 3\phi + \Delta_{3-}) \tag{6}$$

This can be rewritten as:

$$s(t) = \frac{A}{2}\sin(\omega_c t + \varphi) + \frac{A_{3+}}{2}\sin(\omega_c t + 3\varphi + \Delta_{3+}) - \tag{7}$$
$$\frac{A_{3+}}{2}\sin(\omega_c t - (3\varphi + \Delta_{3+})) + \frac{A_{3+}}{2}\sin(\omega_c t + 3\varphi + \Delta_{3+}) +$$
$$\frac{A_{3+}}{2}\sin(\omega_c t - (3\varphi + \Delta_{3+})) + \frac{A}{2}\sin(\omega_c t + \varphi) +$$
$$\frac{A_{3-}}{2}\sin(\omega_c t - 3\varphi + \Delta_{3-}) - \frac{A_{3-}}{2}\sin(\omega_c t - (-3\varphi + \Delta_{3-})) +$$
$$\frac{A_{3-}}{2}\sin(\omega_c t - 3\varphi + \Delta_{3-}) + \frac{A_{3-}}{2}\sin(\omega_c t - (-3\varphi + \Delta_{3-}))$$

In the case of CW modulation:

$$\omega_c t + \phi = (\omega_c + \omega_m) t \tag{8}$$

since $$\frac{\varphi}{t} = \frac{d\varphi}{dt} = \omega_m \text{ (under the condition } \varphi(t=0) = 0) \tag{9}$$

The wanted output frequency is:

$$\omega_w = \omega_c + \omega_m \tag{10}$$

The 3$^{rd}$ order distortion products thus generate components with amplitude $A_{3+}$ at the frequency $\omega_c + 3\omega_m = \omega_w + 2\omega_m$ and with amplitude $A_{3-}$ at frequency $\omega_c - 3\omega_m = \omega_w - 4\omega_m$.

In the case of CW modulation s(t) becomes:

$$s_{cw}(t) = \frac{A}{2}\sin(\omega_w t) + \frac{A_{3+}}{2}\sin(\omega_w t + 2\omega_m t + \Delta_{3+}) - \tag{11}$$
$$\frac{A_{3+}}{2}\sin(\omega_w t - (2\omega_m t + \Delta_{3+})) + \frac{A_{3+}}{2}\sin(\omega_w t + 2\omega_m t + \Delta_{3+}) +$$
$$\frac{A_{3+}}{2}\sin(\omega_w t - (2\omega_m t + \Delta_{3+})) + \frac{A}{2}\sin(\omega_w t) +$$
$$\frac{A_{3-}}{2}\sin(\omega_w t - 4\omega_m t + \Delta_{3-}) - \frac{A_{3-}}{2}\sin(\omega_w t - (-4\omega_m t + \Delta_{3-})) +$$
$$\frac{A_{3-}}{2}\sin(\omega_w t - 4\omega_m t + \Delta_{3-}) + \frac{A_{3-}}{2}\sin(\omega_w t - (-4\omega_m t + \Delta_{3-}))$$

From equation (11) it can be seen that each of the two components at frequency $\omega_w + 2\omega_m$ and at $\omega_w - 4\omega_m$ can be written as a sum of a AM signal and a FM signal. For example for the components at frequency $\omega_w + 2\omega_m$:

$$s_{+3}(t) = \frac{A}{2}\sin(\omega_w t) + \tag{12}$$
$$\frac{A_{3+}}{2}\sin(\omega_w t + 2\omega_m t + \Delta_{3+}) - \frac{A_{3+}}{2}\sin(\omega_w t - (2\omega_m t + \Delta_{3+})) +$$
$$\frac{A_{3+}}{2}\sin(\omega_w t + 2\omega_m t + \Delta_{3+}) + \frac{A_{3+}}{2}\sin(\omega_w t - (2\omega_m t + \Delta_{3+}))$$

or

-continued $$s_{+3}(t) = \frac{A}{4}\Big[\sin(\omega_w t) + \qquad (13)$$
$$\frac{\beta_+}{2}\{\sin(\omega_w t + 2\omega_m t + \Delta_{3+}) - \sin(\omega_w t - (2\omega_m t + \Delta_{3+}))\}\Big] +$$
$$\frac{A}{4}\Big[\sin(\omega_w t) +$$
$$\frac{M_+}{2}\{\sin(\omega_w t + 2\omega_m t + \Delta_{3+}) + \sin(\omega_w t - (2\omega_m t + \Delta_{3+}))\}\Big]$$

where $$\beta_+ = \frac{4A_{3+}}{A}$$

is the frequency modulation index
and $$M_+ = \frac{4A_{3+}}{A}$$

is the amplitude modulation index.
Similarly for the component at frequency $\omega_w - 4\omega_m$:

$$s_{-3}(t) = \frac{A}{4}\Big[\sin(\omega_w t) + \qquad (14)$$
$$\frac{\beta_-}{2}\{\sin(\omega_w t + 4\omega_m t + \Delta_{3-}) - \sin(\omega_w t - (4\omega_m t + \Delta_{3-}))\}\Big] +$$
$$\frac{A}{4}\Big[\sin(\omega_w t) +$$
$$\frac{M_-}{2}\{\sin(\omega_w t + 4\omega_m t + \Delta_{3-}) + \sin(\omega_w t - (4\omega_m t + \Delta_{3-}))\}\Big]$$

where $\beta_- = \frac{4A_{3-}}{A}$ and $M_- = \frac{4A_{3-}}{A}$

And $$s_{cw}(t) = s_{+3}(t) + s_{-3}(t) \qquad (15)$$

To convince oneself that the signal $s_{+3}(t)$ in equation (13) is actually a sum of an AM signal and a FM signal it is useful to look at the basic CW modulated FM and AM signals.

For a CW modulated FM signal with carrier frequency $\omega_c$ and modulation frequency $\omega_m$:

$$s_{FM}(t) = \sin(\omega_c t + \beta\sin(\omega_m t)) \qquad (16)$$
$$= \sin(\omega_c t) \cdot \cos(\beta\sin(\omega_m t)) + \cos(\omega_c t) \cdot \sin(\beta\sin(\omega_m t))$$

For $\beta \ll \frac{\pi}{2}$: $\cos(\beta\sin(\omega_m t)) \cong 1$ \qquad (17a)

and $\sin(\beta\sin(\omega_m t)) \cong \beta\sin(\omega_m t)$ \qquad (17b)

Therefore:

$$s_{FM}(t) \cong \sin(\omega_c t) + \cos(\omega_c t) \cdot \beta\sin(\omega_m t) \qquad (18)$$
$$= \sin(\omega_c t) + \frac{\beta}{2}\{\sin(\omega_c t + \omega_m t) - \sin(\omega_c t - \omega_m t)\}$$

For a CW modulated AM signal with carrier frequency $\omega_c$ and modulation frequency $\omega_m$:

$$s_{AM}(t) = \sin(\omega_c t) \cdot (1 + M \cdot \cos(\omega_m t)) \qquad (19)$$
$$= \sin(\omega_c t) + M \cdot \sin(\omega_c t) \cdot \cos(\omega_m t)$$
$$= \sin(\omega_c t) + \frac{M}{2}\{\sin(\omega_c t + \omega_m t) + \sin(\omega_c t - \omega_m t)\}$$

By comparing equation 13 to equation 18 and 19 (ignoring the constant phase term $\Delta_{3+}$) it is easy to see that the signal $s_{+3}(t)$ in equation (13) is indeed a sum of an AM signal and a FM signal with carrier frequency $\omega_w$ and modulation frequency $2\omega_m$.

A translation loop transmitter architecture will remove any AM on the input of the loop since the translation loop is only sensitive to phase changes and has a constant amplitude output. The signal in equation (13) will thus create a signal at the output of the translation loop:

$$\tilde{s}_{+3}(t) = \qquad (20)$$
$$\frac{A}{2}\sin(\omega_w t) + \frac{A_{3+}}{2}\{\sin(\omega_w t + 2\omega_m t + \Delta_{3+}) - \sin(\omega_w t - (2\omega_m t + \Delta_{3+}))\}$$

The signal $s_{cw}(t)$ in equation (11) will generate a signal $\tilde{s}_{cw}(t)$ at the translation loop output:

$$\tilde{s}_{cw}(t) = A \cdot \sin(\omega_w t) + \qquad (21)$$
$$\frac{A_{3+}}{2}\{\sin(\omega_w t + 2\omega_m t + \Delta_{3+}) - \sin(\omega_w t - (2\omega_m t + \Delta_{3+}))\} +$$
$$\frac{A_{3-}}{2}\{\sin(\omega_w t + 4\omega_m t + \Delta_{3-}) - \sin(\omega_w t - (4\omega_m t + \Delta_{3-}))\}$$

One effect of the translation loop is thus that it generates an "image" frequency component, or in other words, it distributes the signal symmetrically about the wanted output frequency $\omega_w$.

The general signal s(t) in equation (7) will generate an output:

$$\tilde{s}(t) = A \cdot \sin(\omega_c t + \varphi) + \qquad (22)$$
$$\frac{A_{3+}}{2}\sin(\omega_c t + 3\varphi + \Delta_{3+}) - \frac{A_{3+}}{2}\sin(\omega_c t - (3\varphi + \Delta_{3+})) +$$
$$\frac{A_{3-}}{2}\sin(\omega_c t - 3\varphi + \Delta_{3-}) - \frac{A_{3-}}{2}\sin(\omega_c t - (-3\varphi + \Delta_{3-}))$$

Again, comparing equation (22) to equation (6), it is evident that the translation loop generates two additional components.

Figure 7:
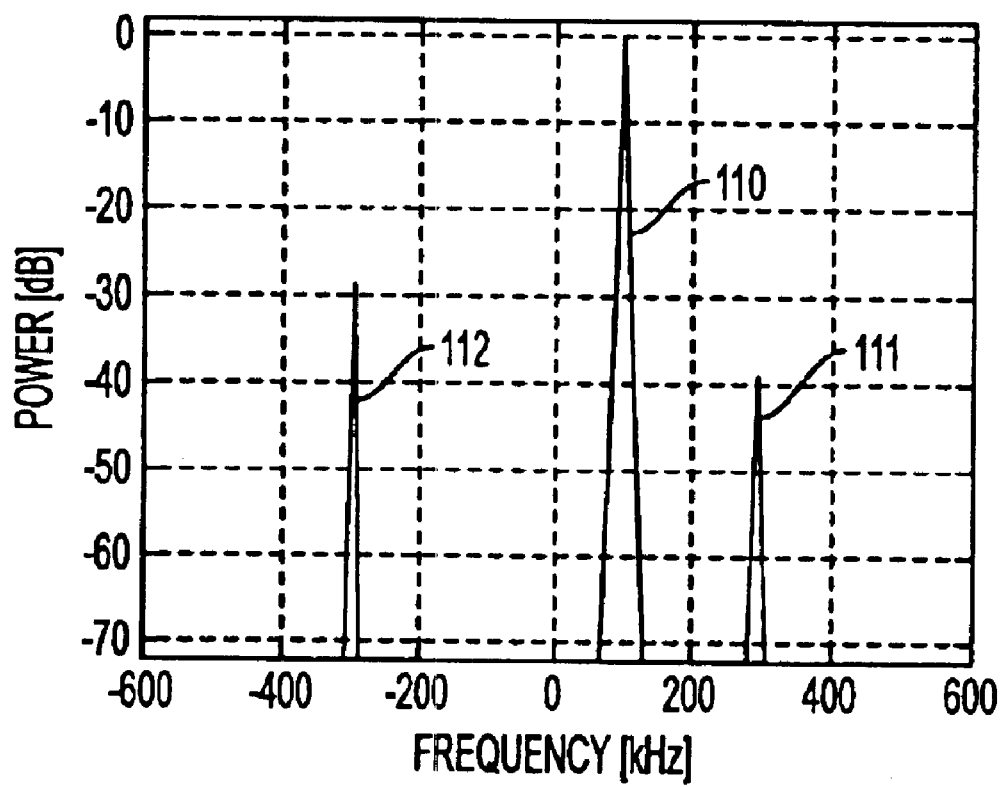
FIG. 7 illustrates the spectrum of the output of a modulator with third order distortion.

FIG. 7 shows the output spectrum of a modulator with $3^{rd}$ order distortion. In this example $A_{3+}$ and $A_{3-}$ are respectively 40 dB and 30 dB below the wanted signal. The modulator is modulated with a 100 kHz CW signal. The wanted sideband is identified with numeral 110; the third order modulation distortion product at the frequency $\omega_c + 3\omega_m = \omega_w + 2\omega_m$ is identified with numeral 111; and the third order modulation distortion product at the frequency $\omega_c - 3\omega_m = \omega_w - 4\omega_m$ is identified with numeral 112.

Figure 8:
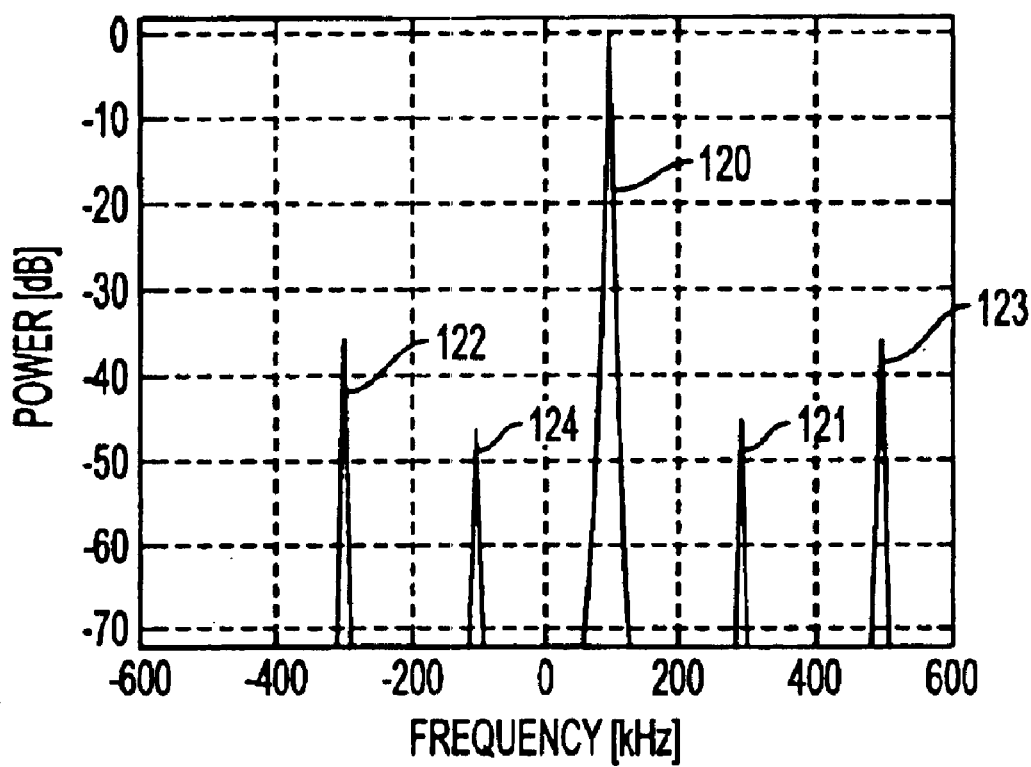
FIG. 8 illustrates the spectrum of the output of a translation loop coupled to the modulator of FIG. 8.

In FIG. 8, the effect of passing this signal trough a translation loop is shown. At the translation loop output, the wanted sideband as upconverted to RF frequencies is identifed with numeral 120. In addition, each of the distortion products 111, 112 has a "mirror product", identified respectively with numerals 121 and 122, each of which has been lowered by 6 dB compared to the components 111 and 112 of FIG. 7 (reflecting the Am suppression performed by the translation loop, which lowers the amplitude of each component by half). Further, the suppression of AM performed by the translation loop introduces components 123 and 124.

The foreoing "mirror" effect is highly undesirable in a GSM design. The reason is that the spectrum at the translation loop output becomes wider than the input spectrum.

Figure 9:
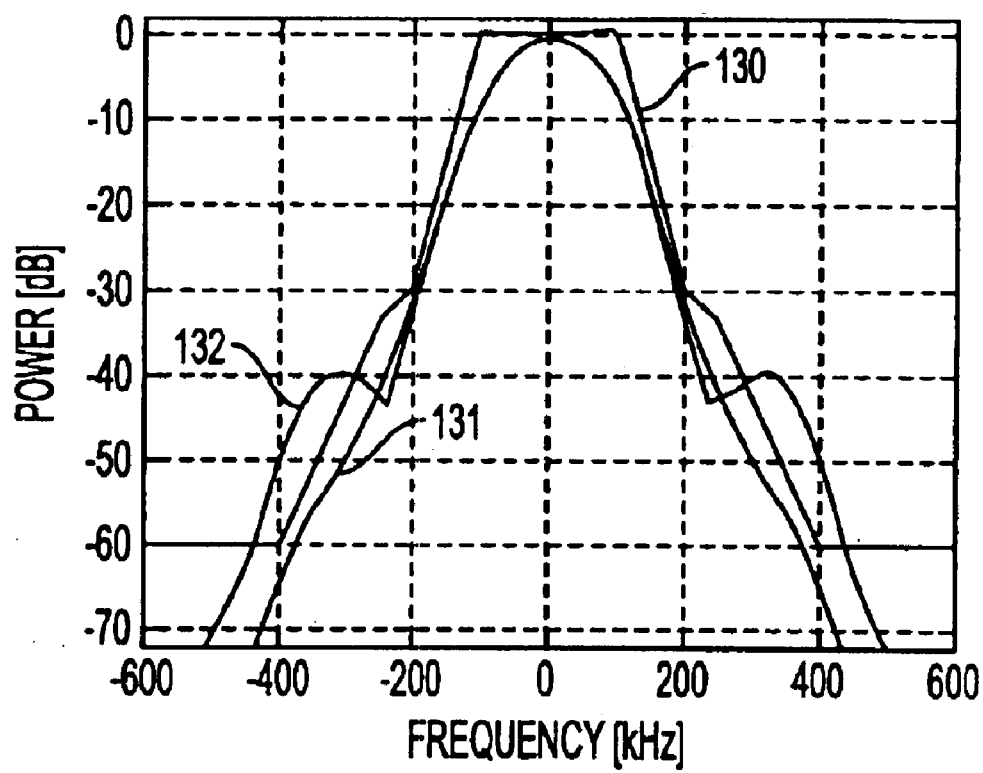
FIG. 9 illustrates the spectrum of a GMSK modulated signal at the modulator and translation loop outputs in relation to the GSM specification spectral limits.

In FIG. 9, the spectrum of a GMSK signal is shown. The modulator has the same $3^{rd}$ order distortion products as in FIGS. 7 and 8. FIG. 9 shows the spectrum both at the modulator output (numeral 131) and at the translation loop output (numeral 132). Also shown are the GSM specification spectral limits (numeral 130), and it is obvious that even though the modulator output 131 is within the limit, the translation loop output 132 is not.

It is possible to predistort the I and Q signals to compensate for $3^{rd}$ order distortion. In this case, the generation of the I and Q signals becomes:

$$I = A \cdot \cos(\phi) + C_{3+} \cdot \cos(3\phi + \theta_{3+}) + C_{3-} \cdot \cos(-3\phi + \theta_{3-}) \quad (23a)$$

$$\text{and } Q = A \cdot \sin(\phi) + C_{3+} \cdot \sin(3\phi + \theta_{3+}) + C_{3-} \cdot \sin(-3\phi + \theta_{3-}) \quad (23b)$$

The ideal output of a modulator with I and Q input signals as given by (23a) and (23b) is:

$$s(t) = A \cdot \sin(\omega_c t + \phi) + C_{3+} \cdot \sin(\omega_c t + 3\phi + \theta_{3+}) + C_{3-} \cdot \sin(\omega_c t - 3\phi + \theta_{3-}) \quad (24)$$

For a modulator with $3^{rd}$ order distortion, a good approximation to the output signal is:

$$s(t) \approx A \cdot \sin(\omega_c t + \phi) + C_{3+} \cdot \sin(\omega_c t + 3\phi + \theta_{3+}) + C_{3-} \cdot \sin(\omega_c t - 3\phi + \theta_{3-}) + A_{3+} \cdot \sin(\omega_c t + 3\phi + \Delta_{3+}) + A_{3-} \cdot \sin(\omega_c t - 3\phi + \Delta_{3-}) \quad (25)$$

In equation (25), only $3^{rd}$ order products generated the primary terms $A \cdot \cos(\phi)$ and $A \cdot \sin(\phi)$ in equation (23a) and (23b) is taken into account. The additional terms will generate $3^{rd}$ order distortion products as well, but since these terms are much smaller than the primary term the $3^{rd}$ order products generated by these terms will be insignificant.

From equation (25), it is easy to see that if:

$$\theta_{3+} \cong \Delta_{3+}$$

$$C_{3+} \cong -A_{3+}$$

$$\theta_{3-} \cong \Delta_{3-}$$

$$C_{3-} \cong -A_{3-}$$

then the $3^{rd}$ order products will be canceled.

What is claimed is:

1. A system for predistorting a baseband signal to reduce or eliminate third order modulation distortion products comprising:
   a predistortion circuit for predistorting a baseband signal to reduce or eliminate third order modulation distortion products, the predistortion circuit responsive to one or more predistortion parameters;
   a quadrature modulator for modulating the predistorted baseband signal; and
   a distortion detector for measuring third order modulation distortion products, and, responsive thereto, determining the one or more predistortion parameters.

2. The system of claim 1 wherein the predistortion circuit includes one or more lookup tables for determining the components I' and Q' of the predistorted baseband signal.

3. The system of claim 1 wherein the one or more predistortion parameters are stored in a memory in the predistortion circuit.

4. The system of claim 1 wherein the distortion detector measures third order modulation distortion products at the output of the modulator.

5. The system of claim 1 further comprising a translational loop for upconverting the modulator output to RF frequencies.

6. The system of claim 5 wherein the distortion detector measures distortion derived from third order modulation distortion products at the output of the translational loop.

7. The system of claim 1 wherein the one or more predistortion parameters $\theta_{3+}$, $C_{3+}$, $\theta_{3-}$, and $C_{3-}$ in the following equations (in which I and Q are the components of the baseband signal):

$$I = A\cos(\phi) + C_{3+}\cos(3\phi + \theta_{3+}) + C_{3-}\cos(-3\phi + \theta_{3-})$$

$$\text{and } Q = A\sin(\phi) + C_{3+}\sin(3\phi + \theta_{3+}) + C_{3-}\sin(-3\phi + \theta_{3-})$$

8. The system of claim 7 wherein the predistortion parameters $\theta_{3+}$, $C_{3+}$, and $\theta_{3-}$ and $C_{3-}$ bear the following relationships to $A_{3+}$, $\Delta_{3+}$, $A_{3-}$, and $\Delta_{3-}$:

$$\theta_{3+} \approx \Delta_{3+}$$

$$C_{3+} \approx -A_{3+}$$

$$\theta_{3-} \approx \Delta_{3-}$$

$$C_{3-} \approx -A_{3-}$$

where $A_{3+}\sin(\omega_c t + 3\phi + \Delta_{3+})$ and $A_{3-}\sin(\omega_c t + 3\phi + \Delta_{3-})$ represent third order modulation products introduced by the modulator.

9. A method for predistorting a baseband signal to reduce or eliminate third order modulation distortion comprising the steps of:
   measuring third order modulation distortion products in a modulated baseband signal;
   determining one or more parameters configured to reduce or eliminate third order modulation distortion in the modulated baseband signal;
   predistorting the baseband signal responsive to the one or more parameters;
   quadrature modulating the baseband signal to generate the modulated baseband signal; and
   deriving a transmission signal from the modulated baseband signal.

10. The method of claim 9 wherein the one or more parameters comprise $\theta_{3+}$, $C_{3+}$, $\theta_{3-}$, and $C_{3-}$, and the predistorting step comprises predistorting I and Q, the components of the baseband signal in accordance with the following equations:

$$I = A\cos(\phi) + C_{3+}\cos(3\phi + \theta_{3+}) + C_{3-}\cos(-3\phi + \theta_{3-})$$

$$\text{and } Q = A\sin(\phi) + C_{3+}\sin(3\phi + \theta_{3+}) + C_{3-}\sin(-3\phi + \theta_{3-})$$

11. The method of claim 9 wherein the deriving step comprises upconverting the modulated baseband signal.

12. The method of claim 9 in which the predistorting step includes generating the components I' and Q' of the predistorted baseband signal using one or more table lookups.

13. A method of deriving one or more predistortion parameters comprising the steps of:
   detecting distortion which is or is derived from third order modulation distortion;
   adjusting one or parameters responsive thereto if the detected distortion is not below a predetermined threshold;
   predistorting a baseband signal using the one or parameters;
   performing the foregoing steps one or more times until the detected distortion is below the predetermined threshold; and
   storing the one or more parameters.

14. The method of claim 13 wherein the one or more parameters comprise $\theta_{3+}$, $C_{3+}$, $\theta_{3-}$, and $C_{3-}$, and the predistorting step comprises predistorting I and Q, the components of the baseband signal, in accordance with the following equations:

$$I = A\cos(\phi) + C_{3+}\cos(3\phi + \theta_{3+}) + C_{3-}\cos(-3\phi + \theta_{3-})$$

and $Q = A\sin(\phi) + C_{3+}\sin(3\phi + \theta_{3+}) + C_{3-}\sin(-3\phi + \theta_{3-})$ 15. The method of claim 14 wherein the first, second, and third steps are repeatedly performed until the parameters $\theta_{3+}$, $C_{3+}$, $\theta_{3-}$, and $C_{3-}$, bear the following relationship to $A_{3+}$, $\Delta_{3+}$, $A_{3-}$, and $\Delta_{3-}$:

$$\theta_{3+} \approx \Delta_{3+}$$
$$C_{3+} \approx -A_{3+}$$
$$\theta_{3-} \approx \Delta_{3-}$$
$$C_{3-} \approx -A_{3-}$$

where $A_{3+}\sin(\omega_c t + 3\phi + \Delta_{3+})$ and $A_{3-}\sin(\omega_c t - 3\phi + \Delta_{3-})$ represent the third order modulation distortion.

* * * * *